Oct. 22, 1968   E. K. BUYZE   3,406,793
PARKING BRAKE FOR A DISC BRAKE
Filed May 5, 1967

INVENTOR.
EDWIN K. BUYZE
BY
ATTORNEY 3,406,793
PARKING BRAKE FOR A DISC BRAKE
Edwin K. Buyze, St. Clair Shores, Mich., assignor to The
 Budd Company, Philadelphia, Pa., a corporation of
 Pennsylvania
Filed May 5, 1967, Ser. No. 636,312
3 Claims. (Cl. 188—73)

ABSTRACT OF THE DISCLOSURE

A vehicle parking brake for use with the disc of a conventional disc brake. A caliper housing supports a brake shoe on each side of the disc. Upon actuation, a plunger engages a sprag mounted in a pocket on one of the brake shoes for urging and holding both of the brake shoes into contact with the disc. Upon rotative movement of the disc, the brake shoes will be circumferentially displaced causing sprag to increase the holding pressure on the brake shoes.

---

This invention relates to an automotive disc brake and more particularly to a parking brake that is independent of the conventional disc brake assembly.

The parking or emergency brakes normally used on vehicles apply pressure to restrict movement of the vehicle drive shaft or independently apply pressure to the regular brake pads urging them into engagement with the disc to act as a parking brake.

It is an object of this invention to provide a separate parking brake unit for mounting adjacent the conventional disc brake for applying an independent restrictive force to the brake disc without affecting the stability of the disk brake.

Another object of this invention is to provide a braking means for applying the independent restrictive force to a brake disc whereby rotation of the disc in either direction will tend to increase the pressure of the parking brake pads against the disc. With an independent parking brake such as this invention, high servo action is employed to obtain high torque restrictive forces for skidding the vehicle wheels with a minimum input force or load.

These and other objects of this invention may be readily seen by reference to the following specification and drawings wherein.

Figure 1:
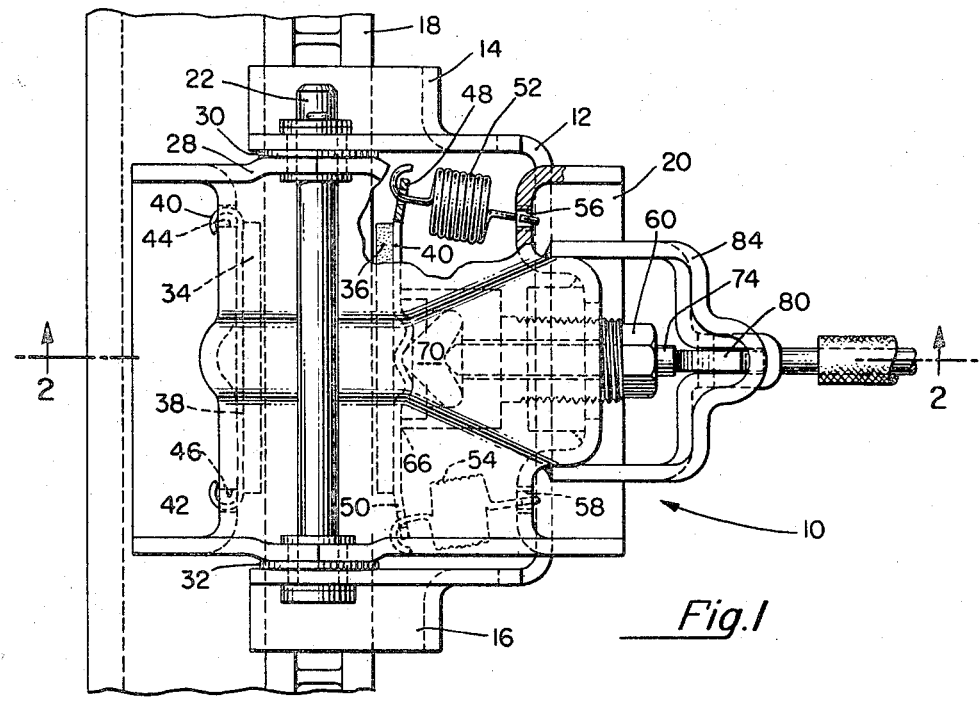
FIG. 1 is a top view of the novel parking brake with sections cut away to illustrate the mounting of the return spring.

Referring now to the drawings as best seen in FIG. 1, the parking brake assembly 10 includes a generally U-shaped support bracket 12 adapted to be secured to a fixed portion of the vehicle. The arms 14, 16 of support bracket 12 extend above the brake disc 18 for pivotally supporting the caliper housing 20 on the hinge pin 22 extending between the arms. The hinge pin 22 is positioned above and in the same plane as the disc 18.

The housing 20 has a generally block C shape with the disc 18 extending into the concave portion between the legs 24, 26 thereof. The back portion 28 of the housing is pivotally supported on the hinge pin 22. Friction washers 30, 32 are placed between the support bracket 12 and housing 20 for holding the housing from excessive movement and to help prevent rattling of the assembly when not in use.

A pair of brake pads 34, 36 are mounted adjacent opposite sides of the disc 18 and are secured to their respective brake shoes 38, 40 in the conventional manner. The brake shoe 38 is securely attached to the leg 24 by a pair of tabs 40, 42 cooperating with a pair of apertures 44, 46 formed in the leg 24 of housing 20. The other brake shoe 40 is resiliently connected to the leg 26 by a pair of tabs 48, 50 and a pair of return springs 52, 54 connected to and extending between the respective tabs 48, 50 and the leg 26. One end of each of the springs 52, 54 is connected to their respective tabs 48, 50 and the other end of each spring is connected to their respective apertures 56, 58 in the leg 26 of the housing 20.

The brake shoe 40 and pad 36 are held adjacent the disc 18 and spaced from leg 26 by a retainer 60. An adjustment nut 62 is secured in an aperture 64 of the housing 20 by welding or other suitable means and is threadably engaged with threads formed on the outside of the retainer 60 for adjustably supporting the retainer in housing 20. The inner edge 66 of retainer 60 contacts the brake shoe 40 about a sprag seat 68 formed in the brake shoe for receiving a cone shaped sprag 70.

The base of the sprag 70 is seated in a recess 72 formed in the end 66 of the retainer 60. A push rod 74 is slidably mounted in the retainer 60 and has one end 76 contacting the back of the sprag 70 and the other end 78 contacting one end 79 of an actuating lever 80.

The actuating lever 80 is pivotally mounted on a pin 82 supported in a pivot base 84 secured to the housing 20 by welding or other suitable means. The inner surface of pivot base 84 also contacts a mating surface of the actuating lever 80 for assisting in the pivotal support of the lever.

A control cable 86 is secured to the other end 88 of the actuating lever by a set screw 90 or other suitable means for pivoting the lever about pivot pin 82 whereby the push rod 74 is reciprocated within the retainer.

The control cable 86 is connected to a manually operable control and locking means (not shown) for applying, holding and releasing the parking brakes.

Figure 2:
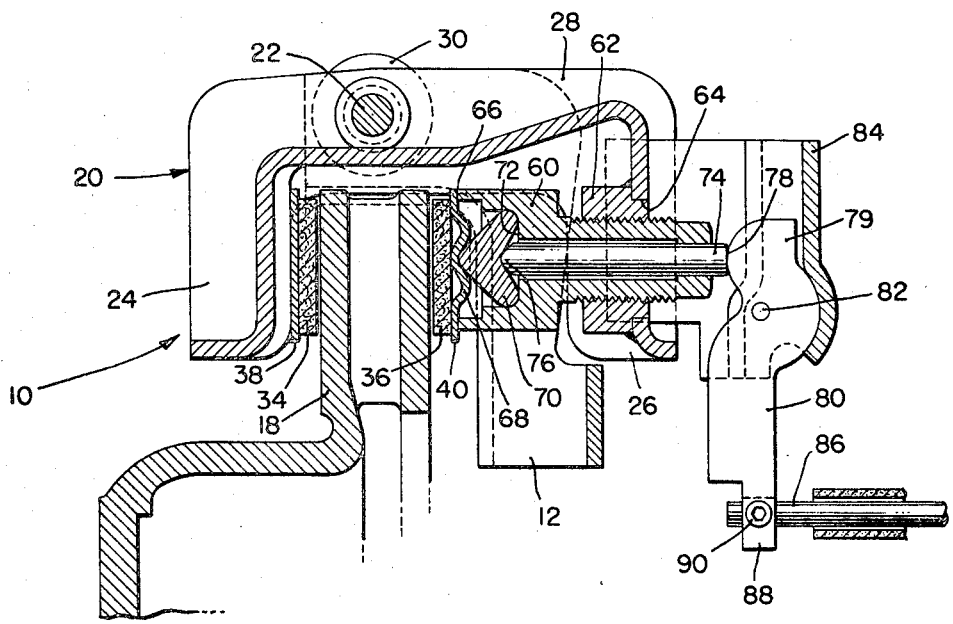
FIG. 2 is a sectional view taken in the direction of the arrows substantially along the line 2—2 of FIG. 1 to illustrate the positioning of the actuation means and brake pads.

In operation with the brake pads 34, 36 spaced from the disc 18, upon manual actuation of the parking brake by moving the brake cable 86 to the right as viewed in FIG. 2, the actuating lever 80 is pivoted about pin 82 and the end 79 in contact with push rod 74 moves the push rod to the left. Such movement of the push rod 74 moves the sprag 70, brake shoe 40, and brake pad 36 toward the disc 18 until the brake pad 36 contacts the disc. When brake pad 36 contacts the disc 18, further movement of control cable 86 causes the actuating lever 80 to react against push rod 74 and the housing 20 is rotated counter clockwise, as seen in FIG. 2, about the hinge pin 22 until the brake pad 34 contacts the disc 18. When both brake pads 34, 36 contact the disc 18, further manual application of force through the control cable 86 will increase the pressure of the pads against the disc.

In the normal use of a parking brake, the pads are placed in contact with the brake disc and the controls secured in that position with a constant pressure holding the pads against the disc for resisting rotative movement. One of the novel features of this parking brake resides in the action of the parking brake once the brake has been secured in the holding position. Rotative movement of the disc will cause the pads and brake shoes to move with the disc because of the frictional engagement whereby the sprag 70 will rotate about end 76 of the push rod 74. As the shoe 40 moves circumferentially, the cone-shaped tip of the sprag 70 located in the sprag pocket 68 is moved therewith and the inner cone of the sprag 70 pivots or rotates about end 76 of the push rod 74 until the base of the cone-shaped sprag contacts the recess 72 in a wedging action between the recess 72 and sprag pocket 68. Such movement will cause increased pressure on the disc by the brake pads since the sprag 70 movement against the edges of the sprag pocket 68 attempts to increase the distance between the pad and the housing thereby applying a greater force by the pads against the disc. In effect the brake becomes self-energizing because as the disc attempts to rotate, the pressure on the disc by the pads resisting rotation becomes greater.

I claim:

1. In a motor vehicle braking system, an auxiliary parking brake for cooperating with a disc brake assembly including a rotatable disc having opposed braking surfaces, said parking brake being actuated independently of the disc brake and including a support bracket having a pair of parallel arms extending adjacent and radially spaced from said disc and secured to a fixed portion of the vehicle, a hinge pin secured in said support bracket and extending between said arms in the plane of said disc, a caliper type housing rotatably supported on said hinge pin for rotative movement normal to the braking surfaces of said rotatable disc, said housing having a pair of depending legs with one of said legs extending radially inwardly on each side of said disc, a first brake shoe fixed to one of said legs adjacent said disc for movement therewith into engagement with one of the braking surfaces of said disc, a second brake shoe supported on the other of said legs and adjacent the other braking surface of said disc, said brake shoes including friction pads secured thereto adjacent the braking surfaces, support means connected to said other leg including a retainer adjustably secured to said other leg of said housing, a nut secured to said housing and threadably engaging a threaded exterior portion of said retainer for adjustably attaching said retainer to said other leg, said second brake shoe contacting and being supported on the inner surface of said retainer spaced from said other leg and adjacent said disc, a pair of springs interconnecting said second brake shoe and said other leg, each of said springs having one end secured to said brake shoe and the other end secured to said other leg for biasing said second brake shoe against said retainer and toward said other leg, actuating means having a brake-on position and brake-off position and operably connected to said second brake pad for overcoming the biasing action of said spring means and for moving said shoes into contact with the braking surfaces of said disc for restricting rotation thereof when in the brake-on position, said actuating means including a sprag means for increasing the pressure of said brake pads against said disc when said disc rotates with the actuating means in the brake-on position, manual control means operably connected to said actuating mean between said positions, and said retainer including a recessed seat adjacent the inner surface and an aperture extending longitudinally through the retainer, a push rod slidably positioned in said aperture, and an actuating lever pivotally mounted on said housing, said push rod having one end engaging said sprag means and the other end engaging said actuating lever whereby manual movement of the actuating lever by the control means causes the push rod and sprag means to overcome the biasing action of the tension springs and move the brake pads into contact with the disc.

2. The apparatus as claimed in claim 1 wherein said sprag means includes a concave cone shaped sprag seat formed on said second brake shoe and a cone shaped sprag positioned in said recessed seat and operably engaging said sprag seat, said one end of said push rod operably contacting said sprag for urging said brake shoes into contact with said disk when said actuating means is moved to brake-on position whereby rotative movement of the disc and brake shoes frictionally engaged therewith, when the actuating means is in the brake-on position, will cause the sprag to cooperate with the sprag seat for increasing the pressure of the brake shoes against the disc.

3. In a motor vehicle braking system, an auxiliary parking brake for cooperating with a disc brake assembly including a rotatable disc having opposed braking surfaces, said parking brake being actuated independently of the disc brake and including a support bracket having a pair of parallel arms extending adjacent and radially spaced from said disc and secured to a fixed portion of the vehicle, a hinge pin secured in said support bracket and extending between said arms in the plane of said disc, a caliper type housing rotatably supported on said hinge pin for rotative movement normal to the braking surfaces of said rotatable disc, said housing having a pair of depending legs with one of said legs extending radially inwardly on each side of said disc, a first brake shoe fixed to one of said legs adjacent said disc for movement therewith into engagement with one of the braking surfaces of said disc, a second brake shoe resiliently secured to the other of said legs and adjacent the other braking surface of said disc, said brake shoes including friction pads secured thereto adjacent said braking surfaces, a retainer secured to said housing and contacting said second brake shoe for supporting said second brake shoe spaced from said other leg and adjacent said disc, an aperture extending longitudinally through said retainer, spring means for resiliently holding said second brake shoe against said retainer, a sprag seat formed on said brake shoe, a sprag supported in said retainer and engaging said sprag seat for pivotal movement therein, a push rod slidably mounted in said aperture having one end contacting said sprag and the other end extending from said retainer, an actuating lever pivotally mounted on said housing having a control end and an actuating end, said actuating end contacting said other end of said push rod for pushing said push rod and said sprag and said second brake shoe toward said disc, and manual actuating means operably connected to said control end for pivotally moving said actuating lever against said push rod for moving said brake pads into contact with said disc.

References Cited

UNITED STATES PATENTS

| 2,981,376 | 4/1961 | Zeidler | 188—73 |
| 3,047,098 | 7/1962 | Olley | 188—73 |
| 3,114,436 | 12/1963 | Larson | 188—73 |
| 3,249,181 | 5/1966 | Muller | 188—73 |
| 3,255,848 | 6/1966 | Harrison | 188—73 |
| 3,285,372 | 11/1966 | Rossmann | 188—73 |
| 3,342,291 | 9/1967 | Warwick et al. | 188—73 |
| 3,358,793 | 12/1967 | Hollnagel et al. | 188—73 |

FOREIGN PATENTS

| 1,043,093 | 9/1966 | Great Britain. |

MILTON BUCHLER, *Primary Examiner.*

GEORGE E. A. HALVOSA, *Assistant Examiner.*